United States Patent
Hamel et al.

(10) Patent No.: US 10,498,264 B2
(45) Date of Patent: Dec. 3, 2019

(54) TORQUE MONITORING SYSTEM FOR A ROTATABLE SHAFT

(71) Applicant: LORD Corporation, Cary, NC (US)

(72) Inventors: Michael Hamel, Essex Junction, VT (US); Jeffrey Tonn, Winooski, VT (US); Daniel O'Neil, St. Albans, VT (US)

(73) Assignee: LORD Corporation, Cary, NC (US)

(*) Notice: Subject to any disclaimer, the term of this patent is extended or adjusted under 35 U.S.C. 154(b) by 0 days.

(21) Appl. No.: 15/314,363

(22) PCT Filed: Jun. 16, 2015

(86) PCT No.: PCT/US2015/036035
§ 371 (c)(1),
(2) Date: Nov. 28, 2016

(87) PCT Pub. No.: WO2015/195667
PCT Pub. Date: Dec. 23, 2015

(65) Prior Publication Data
US 2017/0110993 A1    Apr. 20, 2017

Related U.S. Application Data

(60) Provisional application No. 62/012,744, filed on Jun. 16, 2014.

(51) Int. Cl.
*G01L 3/00* (2006.01)
*H02P 6/08* (2016.01)
(Continued)

(52) U.S. Cl.
CPC .............. *H02P 6/08* (2013.01); *F16H 59/14* (2013.01); *F16H 59/16* (2013.01); *G01L 3/108* (2013.01);
(Continued)

(58) Field of Classification Search
CPC . G01L 3/00; G01L 3/04; G01L 25/003; G01L 3/1457; G01L 5/0019; G01L 3/10;
(Continued)

(56) References Cited

U.S. PATENT DOCUMENTS 5,263,113 A * 11/1993 Naitoh .................... B21B 37/46
                                                         318/432
2004/0113790 A1 * 6/2004 Hamel .................. A61F 2/4657
                                                         340/572.1
(Continued)

FOREIGN PATENT DOCUMENTS

| CN | 103 728 132 | 4/2014 |
|---|---|---|
| EP | 0 676 627 | 10/1995 |
| WO | 2013/190126 | 12/2013 |

*Primary Examiner* — Bickey Dhakal (57) ABSTRACT

A torque monitoring system includes a rotatable measurement interface and a stationary data receiver. The measurement interface is configured to be attached to a rotatable shaft. The measurement interface includes a strain gauge, a processor, and a near field communication (NFC) transceiver coil. The stationary data receiver is stationary with respect to the rotating shaft. The stationary data receiver includes a processor and an NFC transceiver coil. The rotatable measurement interface receives operating power via its NFC transceiver coil that is derived from a radio signal wirelessly transmitted by the NFC transceiver coil in the stationary data receiver. The processor in the rotatable measurement interface is configured to receive strain gauge signals from the strain gauge indicative of torque on the rotatable shaft and wirelessly transmit digital data indicative of the strain gauge signals through the NFC transceiver coils to the processor in the stationary data receiver.

8 Claims, 6 Drawing Sheets

(51) Int. Cl.
  *G01L 3/10* (2006.01)
  *F16H 59/14* (2006.01)
  *H02K 11/24* (2016.01)
  *H02K 11/30* (2016.01)
  *H04B 5/00* (2006.01)
  *F16H 59/16* (2006.01)

(52) U.S. Cl.
  CPC ............ *H02K 11/24* (2016.01); *H02K 11/30* (2016.01); *H04B 5/0031* (2013.01)

(58) Field of Classification Search
  CPC ........... G01L 3/108; H02P 6/08; H02K 11/24; H04B 5/0031
  See application file for complete search history.

(56) References Cited

U.S. PATENT DOCUMENTS

2013/0211740 A1* 8/2013 Ramamurthy .......... G01L 3/108
  702/42
2015/0330851 A1* 11/2015 Beligere ................ G01L 3/108
  73/862.338

\* cited by examiner

TORQUE MONITORING SYSTEM FOR A ROTATABLE SHAFT

CROSS-REFERENCE TO RELATED APPLICATIONS

This application claims priority to U.S. Provisional Appl. No. 62/012,744, entitled TORQUE MONITORING FEEDBACK DEVICE, filed Jun. 16, 2014, and incorporated herein by reference in its entirety.

BACKGROUND

Many types of systems include a rotating shaft. For example, electric motors and internal combustion engines drive shafts and/or transmissions of vehicles, crafts, manufacturing systems, and other devices. While a rotating shaft may be exposed to normally occurring resistive loads, cyclic and intermittent forces may be fed back into the shafts and transmissions from other components and loads. Combined with the normally occurring forces, such additional forces may reduce the service life of the rotating shaft. Further, such abnormal forces and vibrations may result in a failure of the shaft that may damage other components as well.

SUMMARY

In one embodiment, a torque monitoring system includes a rotatable measurement interface and a stationary data receiver. The measurement interface is configured to be attached to a rotatable shaft. The measurement interface includes a strain gauge, a processor, and a near field communication (NFC) transceiver coil. The stationary data receiver is stationary with respect to the rotating shaft. The stationary data receiver includes a processor and an NFC transceiver coil. The rotatable measurement interface receives operating power via its NFC transceiver coil that is derived from a radio signal wirelessly transmitted by the NFC transceiver coil in the stationary data receiver. The processor in the rotatable measurement interface is configured to receive strain gauge signals from the strain gauge indicative of torque on the rotatable shaft and wirelessly transmit digital data indicative of the strain gauge signals through the NFC transceiver coils to the processor in the stationary data receiver.

In another embodiment, a torque monitoring and feedback system includes a rotatable drive shaft, a rotatable measurement interface, a stationary data receiver, and an electronics control unit (ECU). The rotatable measurement interface is attached to the rotatable drive shaft so as to rotate in unison with rotatable drive shaft. The measurement interface including a strain gauge, a processor, and a transceiver coil. The stationary data receiver is contained in a housing and stationary with respect to the rotating drive shaft. The stationary data receiver includes a processor and a transceiver coil. The ECU is configured to communicate with the stationary data receiver. The rotatable measurement interface receives operating power via its transceiver coil that is derived from a radio signal wirelessly transmitted by the transceiver coil in the stationary data receiver. The processor in the rotatable measurement interface is configured to receive strain gauge measurement data from the strain gauge and wirelessly transmit data indicative of the measurement data through the transceiver coils to the processor in the stationary data receiver.

In yet another embodiment, a system includes a main drive shaft, a parallel drive shaft, and a transmission mechanically linking the main drive shaft to the parallel drive shaft. A first rotatable measurement interface is attached to the main drive shaft so as to rotate in unison with main drive shaft. The first measurement interface includes a strain gauge and a transceiver coil. A first stationary data receiver is contained in a housing and stationary with respect to the main drive shaft. The first stationary data receiver includes a transceiver coil for wireless communication with the transceiver coil of the first rotatable measurement device. A second rotatable measurement interface is attached to the parallel drive shaft so as to rotate in unison with parallel drive shaft. The second measurement interface includes a strain gauge and a transceiver coil. A second stationary data receiver is contained in a housing and stationary with respect to the parallel drive shaft. The second stationary data receiver includes a transceiver coil for wireless communication with the transceiver coil of the second rotatable measurement device. The first and second rotatable measurement interfaces receive power from and provide data communications to their respective first and second stationary data receivers via the corresponding transceiver coils.

DETAILED DESCRIPTION

This disclosure relates to systems and methods for monitoring the torque of one or more rotatable shafts for use in any of a variety of systems. Examples of such systems include manufacturing systems and drive systems. One non-limiting example of a drive system is a drive rotor of a helicopter. In some systems, cyclic and/or intermittent forces and/or vibrations may feed back to the shaft and/or transmission from other components so that the shaft and/or transmission not only experience the normally anticipated forces of driving resistive rotation loads but also cyclic and/or intermittent variations in rotational loading. In some systems, as components such as bearings wear or otherwise degrade, the forces required to rotate the shaft may gradually increase. The systems and methods disclosed herein monitor the effect of the forces applied to the shafts and the transmissions in a manner configured to provide notice and/or information regarding changes in cyclic, transient, or gradually changing of torque loads so that the monitoring and collection of data regarding loading of a shaft and/or transmission may be utilized to mitigate cyclic fatigue failures, resonant loading failures, inefficient operation, or other types of undesirable outcome related to an undesirable torque loading of a shaft. Accordingly, a torque monitoring and feedback system is disclosed below that may be operated according to a variety of methods and embodiments described herein.

Figure 1:
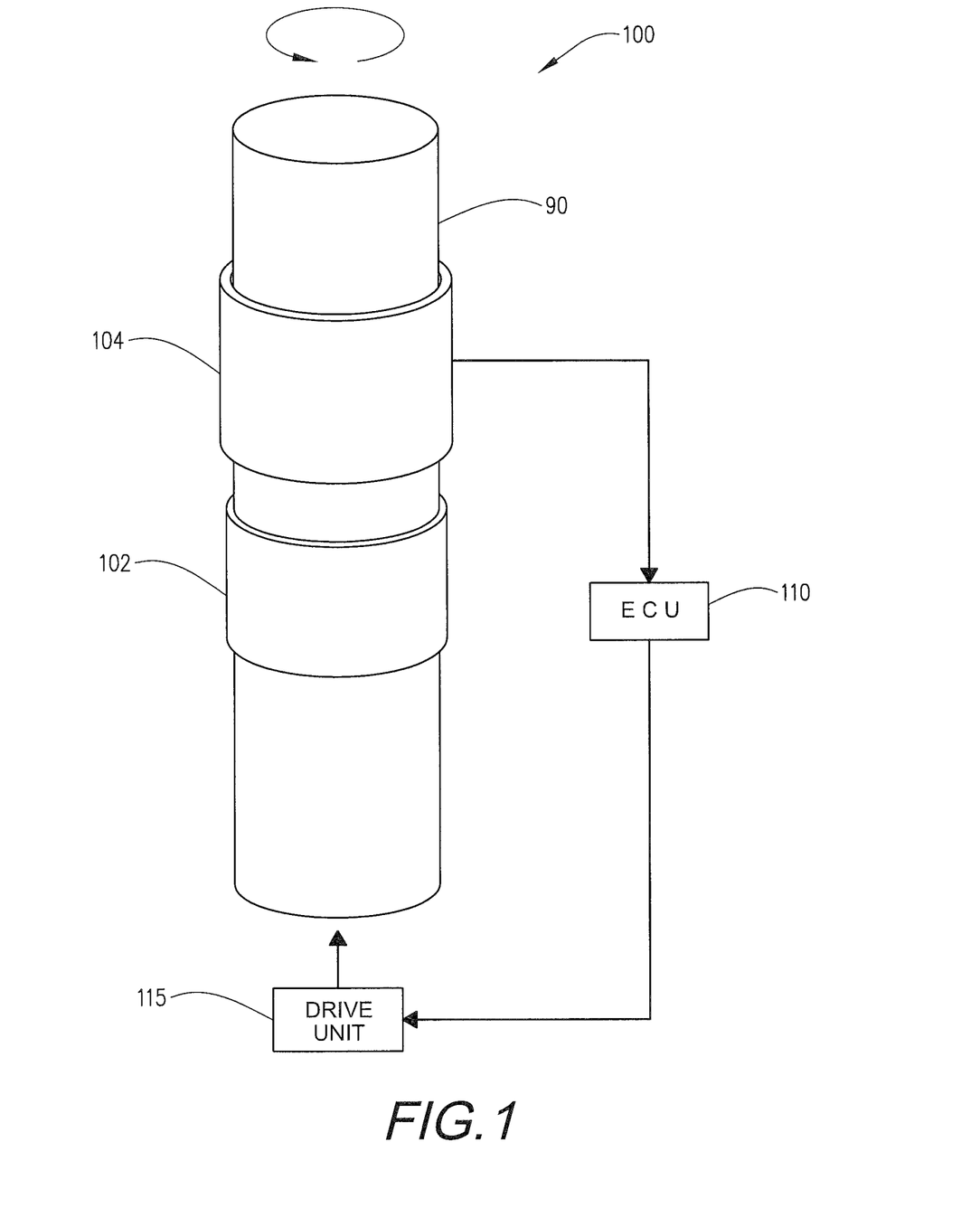
FIG. 1 illustrates a torque monitoring and feedback system in accordance with various embodiments.

FIG. 1 illustrates a torque monitoring and feedback system 100 in accordance with various embodiments. In the non-limiting example shown, the torque monitoring and feedback system 100 includes a rotatable measurement interface 102 attached to a rotatable shaft 90. The rotatable shaft may be any type of rotating shaft, such as a drive shaft usable in, for example, a vehicle or a manufacturing system. The rotatable measurement interface 102 is rigidly attached to the shaft 90 so that the rotatable measurement interface rotates with the shaft. The rotatable measurement interface 90 may include a variety of components such as a strain gauge, a processor, and a transceiver coil. In some embodiments, the components of the rotatable measurement interface 102 may be distributed radially about shaft 90 to minimize unbalancing forces that may be generated by rotation of the rotatable measurement interface 102 along with the shaft.

The system 100 also includes a stationary data transceiver 104, which may surround a circumference of shaft 90 but is not rigidly attached to the shaft. Thus, as the shaft 90 rotates, the stationary data transceiver does not rotate. The stationary data transceiver 104 may be contained in a housing that is separate and apart from the rotatable shaft 90. The stationary data transceiver 104 may include various components such as a processor and a transceiver coil.

The stationary data transceiver 104 remains in a fixed position longitudinally relative to the rotatable measurement interface 102 so that the spacing L1 between the stationary data transceiver and the rotatable measurement interface generally is constant despite the rotation of the shaft and rotatable measurement interface relative to the stationary data transceiver.

The transceivers coils of the stationary data transceiver 104 and the rotatable measurement interface 102 are used to transfer power from the stationary data transceiver to the rotatable measurement interface to provided operating power for the components of the rotatable measurement interface. The transceiver coils are also used as a wireless data communication link between rotatable measurement interface and stationary data transceiver. For example, the rotatable measurement interface 102 may transmit digital data encoding information of the strain gauge to the stationary data receiver 104.

An electronics control unit (ECU) 110 also is shown in communication with the stationary data receiver 104. The stationary data receiver 104 may forward to the ECU 110 data, alerts, etc. related to the operation of and events detected by the stationary data receiver and/or the rotatable measurement interface 102. Examples of such detected events include one or more of a vibration event, a tension event, a compression event, a bending event, a resonance event, and a torque event. The rotatable measurement interface 102 may include multiple strain gauges and other types of sensors to be able to detect such events. These various events may be a vibration, tension, compression, bending, resonance, or torque level detected in excess of a corresponding threshold. For example, a strain gauge may output a voltage proportional the strain detected by the gauge. The voltage can then be translated by processor 126, 136 to a strain measurement. This measurement can then be compared against a user-specified threshold strain level. As a result of the wireless communication between the rotatable measurement interface 102 and stationary data receiver 104 which in turn is coupled to the ECU 110, any of these events may be determined to exist by the processor 126 in the rotatable measurement interface 102, the processor 136 in the stationary data receiver 104, and/or the ECU 110. The threshold value may be determined by the system designer and can be loaded into memory in the stationary data receiver 104 and/or rotatable measurement interface 102 (e.g., loaded into storage integrated in the processors 126, 136). Strain on a shaft can be caused by any of the events (vibration, tension, etc.) described above. Depending on gauge configuration (e.g., how the gauge is mounted to the shaft 90), different events can be measured. The voltage output from the gauge will be proportional to the amplitude of the event and this output voltage will be translated into a strain measurement.

For example, the processor 126 in the rotatable measurement interface 102 may process the strain gauge signal and determine that a mechanical event has occurred, or is occurring. The processor 126 in the rotatable measurement interface 102 can then transmit a signal through the NFC interface to the stationary data receiver 104 that a mechanical event has occurred or is occurring. Through the ECU 110, the stationary data receiver 104 can then cause the drive unit 115 to adjust the torque and/or speed of a motor driving the shaft 90 (in the example in which the shaft is actively driven). Alternatively, the stationary data receiver 104 sends a signal to other system logic that a mechanical event has occurred and such system logic will take appropriate action commensurate with the specifics of the particular system. In other embodiments, the rotatable measurement interface 102 sends digital data indicative of the strain gauge signal across the NFC interface to the stationary data receiver 104, and the stationary data receiver 104 processes such data to determine that a mechanical event has occurred or is occurring. Further still, the digital data indicative of the strain gauge signal may be transmitted from the rotatable measurement interface to the stationary data receiver and on to the ECU 110 (or other system logic) for the ECU 110 to process and determine whether a mechanical event has occurred or is occurring.

A drive unit 115 is provided to actively turn the shaft 90 in embodiments in which the shaft 90 is desired to be actively rotated. In other embodiments, the shaft 90 is not actively rotated and thus the drive unit 115 may not be included in such embodiments. For the example of an actively driven shaft 90, upon detection of any of the events listed above, the ECU 110 may cause the drive unit 115 to control the speed of rotation of the shaft 90 and/or the torque on the shaft. For example, the shaft 90 can be stopped completely upon detection of an excessive vibration, tension, etc. on the shaft, rather then risk damage to the shaft 90 and other components in the vicinity of the shaft. The latency between receiving a signal from a strain gauge, to detecting a problem with the shaft, to adjusting the speed and/or torque of the shaft is relatively small with this system, particular because of the speed of processors 126 and 136 coupled with the NFC interface. In some implementations, the latency is in the range of 1-20 ms. As such, the latency is small enough that the operation of the shaft can be adjusted in real time, or near real-time. As such, the system can react quickly enough to provide, for example, minute adjustments in the timing feed and part synchronization to avoid the costly jams and misfeeds.

Figure 2:
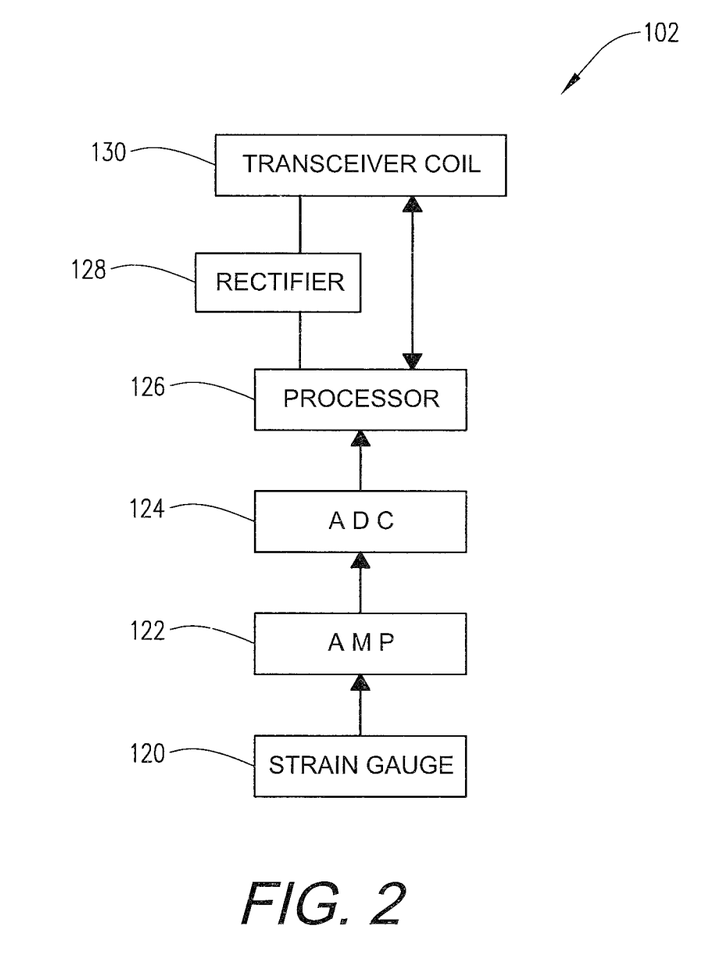
FIG. 2 illustrates a rotatable measurement interface in accordance with various embodiments.

FIG. 2 shows a block diagram of the rotatable measurement interface 102 in accordance with various embodiments. As shown in the example of FIG. 2, the rotatable measurement interface 102 includes a strain gauge, am amplifier (AMP) 122, an analog-to-digital converter (ADC) 124, a processor 126, a rectifier 128, and a transceiver coil 130. The strain gauge 120 may be a torsional strain gauge. More than one strain gauge may be included in the rotatable measurement interface 102 and a separate amplifier 122 may be provided for each strain gauge to increase the magnitude of the signal from the corresponding strain gauge. The ADC 124 converts the analog signal from the strain gauge 120 to a digital equivalent value and provides the digital equivalent value to the processor 126.

The transceiver coil 130 in the rotatable measurement interface 102 receives radiated energy from a corresponding transceiver coil in the stationary data receiver 102. The rectifier 128 rectifies the alternating current (AC)-received energy and provides rectified power to those components in the rotatable measurement interface 102 that are to be actively powered, such as the processor 126. The ADC 124 and amplifier also may receive rectified power for their operation as well as the strain gauge 120 itself. The rectifier may be a half or full bridge rectifier such as a diode-based rectifier. A voltage regulator may be included if desired to regulate the power to the various components of the rotatable measurement interface 102.

The processor 126 also may transmit data back to the stationary data receiver 104 through the transceiver coil 130. Thus, the transceiver coil 130 receives radiation from the stationary data receiver 104 for powering the rotatable measurement interface 102, and transmits data in the opposite direction from the rotatable measurement interface 102 to the stationary data receiver 104.

Figure 3:
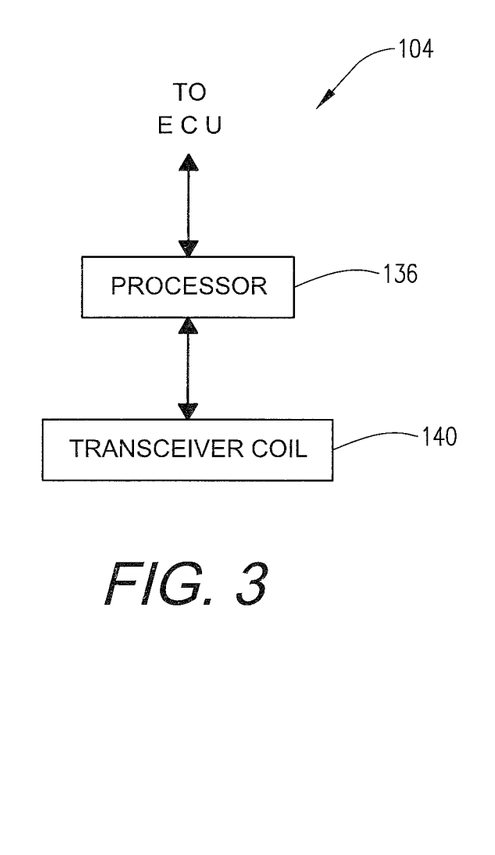
FIG. 3 illustrates a stationary data receiver in accordance with various embodiments.

FIG. 3 shows an example of a block diagram of the stationary data receiver 104. As shown, the stationary data receiver 104 includes a processor 136 coupled to a transceiver coil 140. The processor 136 also includes a data interface for the ECU 110. The stationary data receiver 104 may be battery-operated, may have a dedicated power connection, or may be powered through the connection with the ECU 110.

In one embodiment, the stationary data receiver 104 and the rotatable measurement interface 102 wirelessly interface with each other in accordance with Near Field Communication (NFC). As such, the transceiver coils 130 and 140 are NFC transceiver coils. Other wireless interface standards can be used as well.

Figure 4:
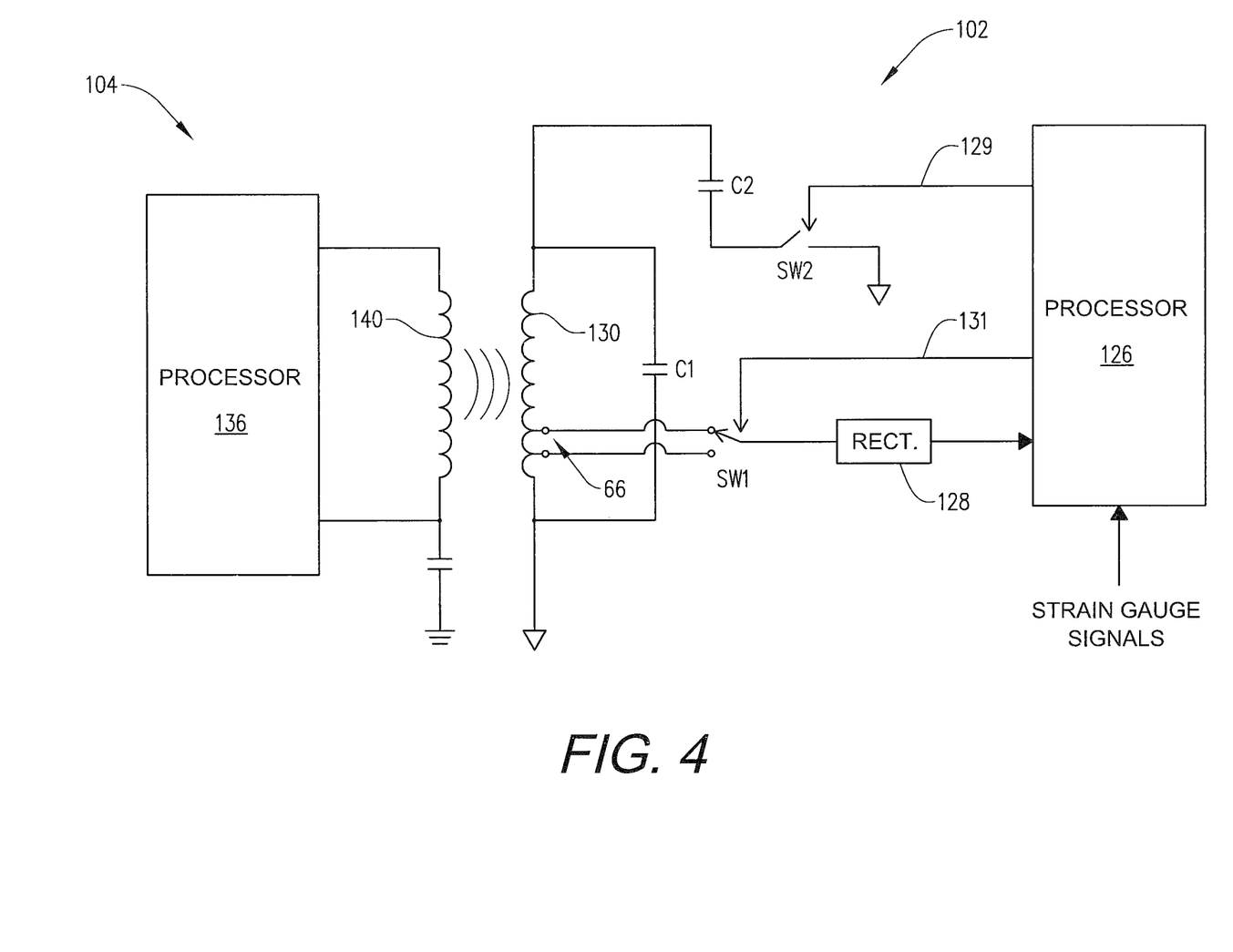
FIG. 4 illustrates an embodiment of the torque monitoring and feedback system including switched reactance element in accordance with various examples.

FIG. 4 illustrates an example of the torque monitoring and feedback system 100. Referring to FIG. 4, the data receiver 104 is shown on the left and the rotatable measurement interface 102 is shown on the right. The data receiver 104 includes a processor 136 coupled to the transceiver coil 140. Additional components may be provided as well.

The rotatable measurement interface 102 includes the transceiver coil 130 as noted above, as well as the processor 126 and rectifier 128. The ADC 124 (not specifically shown in FIG. 4) may be included as part of the processor 126 or may be a separate component. A capacitor C1 is shown connected in parallel across the transceiver coil 130. The combination of the transceiver coil 130 and capacitor C1 forms a tank circuit which functions an electrical resonator storing energy received from the transceiver coil 140 at the tank circuit's resonant frequency. Power transfer from stationary data receiver 104 to rotatable measurement interface 102 by having both transceiver coils 130 and 136 tuned to resonate at the same frequency.

Communications from the remotely powered rotatable measurement interface 102 may be accomplished by taking advantage of changes in impedance with resonant frequency. Shifting the series resonance of transceiver coil 130 toward series resonance or toward parallel resonance provides a substantial change in power drawn by the transceiver coil 130, which in turn changes the loading on the transceiver coil 136 in the stationary data receiver 104. When tuned to series resonance, transceiver coil 130 is in an absorptive state where it places a heavy load on transceiver coil 140, which reduces the Q of its resonance and reduces the voltage across transceiver coil 140. When tuned to parallel resonance, transceiver coil 130 is in a reflective state where it reduces the load on transceiver coil 140 in the stationary data receiver 104, raising the Q of its resonance, and increase the voltage across the transceiver coil 140. Thus, by changing the reactance (and consequently the resonant frequency) of transceiver coil 130 in the rotatable measurement interface 102 relative to transceiver coil 136 in the stationary data receiver 104, the voltage across the stationary data receiver's transceiver coil 140 can be made to vary so as to encode digital data transmitted by the processor 126 of the rotatable measurement interface 102.

The resonant frequency of the transceiver coil 130 in the rotatable measurement interface 102 can be tuned by a switched reactive element. In the embodiment shown in FIG. 4, capacitor C2 is an example of such a switched reactive element. Capacitor C2 is switched in and out of the tank circuit by switch SW2, whose state is controlled by processor 126 via control signal 129. When closed switch SW2 puts capacitor C2 in parallel to tune the coil to the reflective state. When switch SW2 is open, capacitor C2 is removed from the tank circuit and the tank circuit is in the absorptive state. Binary data is sent in this manner, and induces binary encoded amplitude modulation in the stationary data receiver's coil. The switched reactive element may include at least one of a selectable capacitor (or a capacitive divider network).

Figure 5:
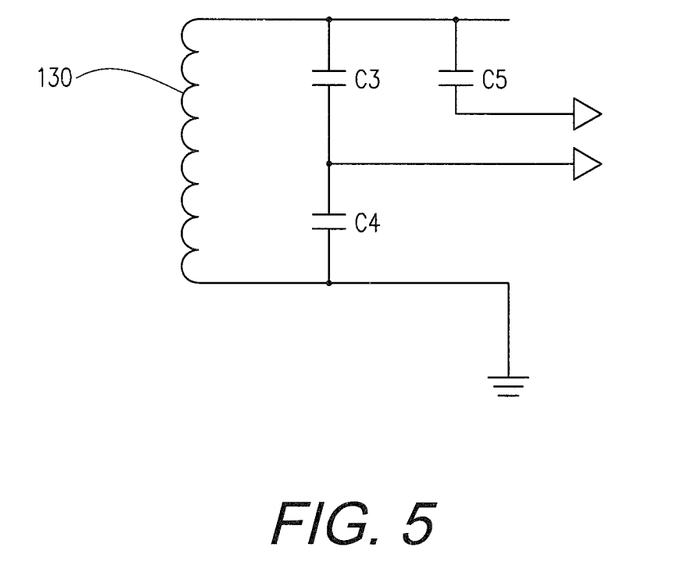
FIG. 5 shows an example of a capacitive divider network usable for data communications in accordance with various embodiments.

FIG. 5 shows an example of a capacitive divider network comprising capacitors C3 and C4 connected in series across transceiver coil 130 and a capacitor C5 provided as shown. Depending on whether a logic 1 or a logic 0 is to be transmitted, the processor 126 can select whether or not to include capacitor C5 and thus can vary the capacitance across the transceiver coil. Other techniques may be implemented as well for varying the impedance across the resonant tank circuit of transceiver coil 130 and capacitor C1.

FIG. 4 also shows the use of multiple selectable taps 66 for impedance matching. Either tap 66 can be selected by processor 126 asserting a control signal 131 to a switch SW1 to provide the selected tap to the rectifier 128. By selecting a desired tap, the effective length of the transceiver coil 130 can be varied.

Figure 6:
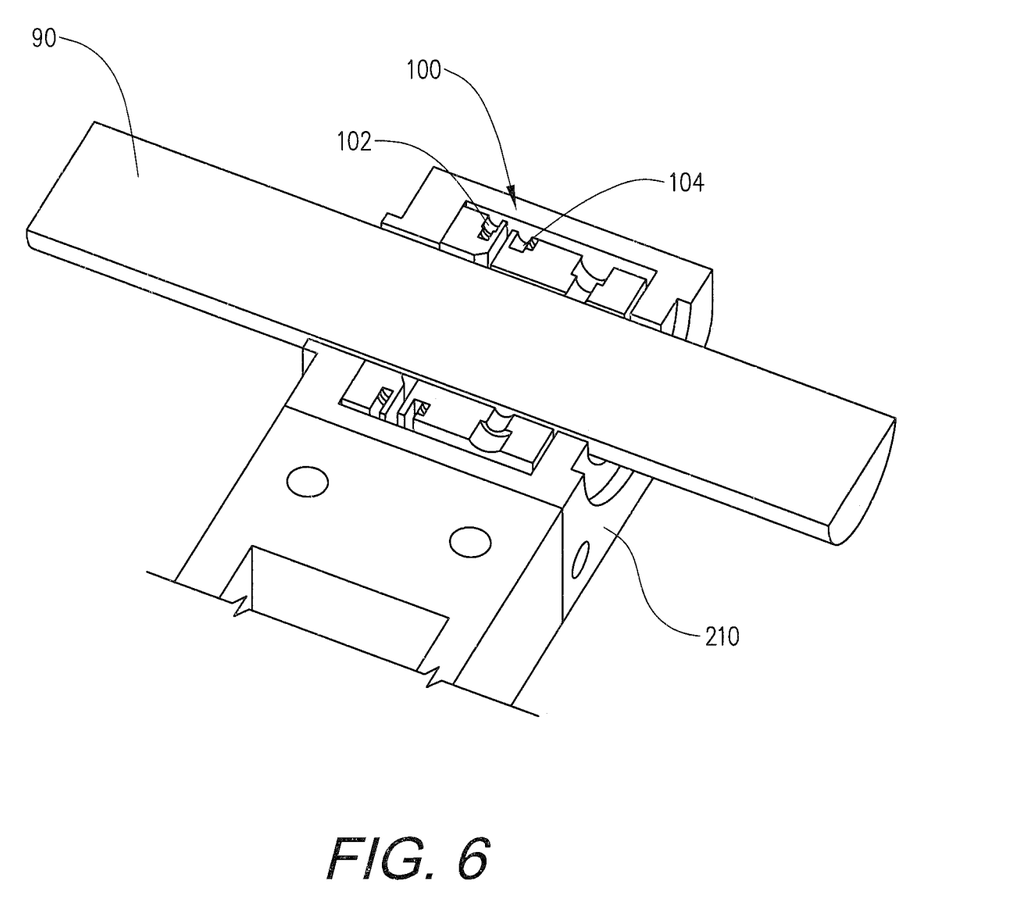
FIG. 6 shows a cutaway view of a portion of the torque monitoring and feedback system in accordance with various embodiments.

Referring now to FIG. 6, a cut-away view is shown showing the rotatable shaft 90 and a housing 210 provided about the shaft. The housing 210 includes the stationary data receiver 104. The rotatable measurement interface 102 is shown attached to the shaft 90.

Figure 7:
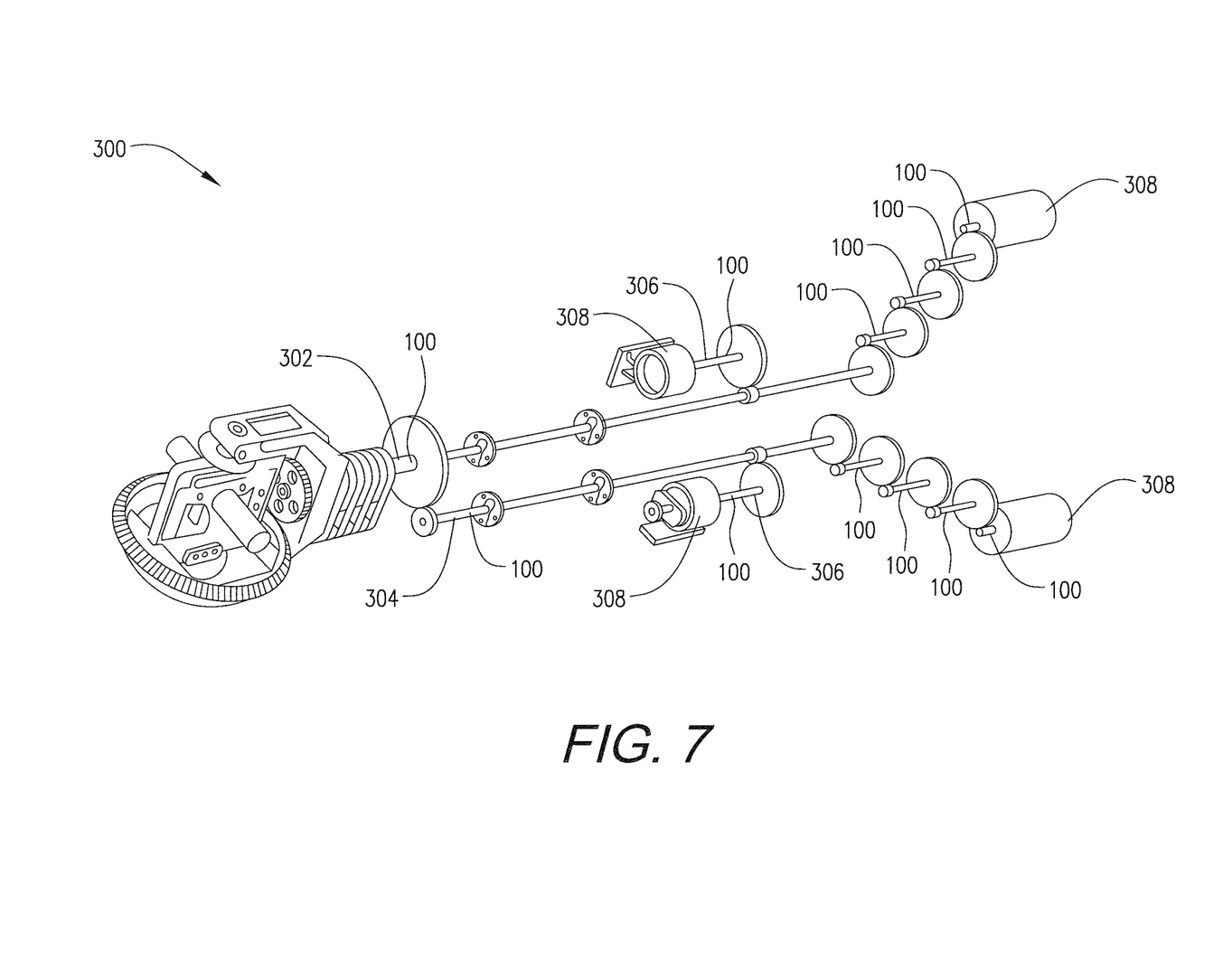
FIG. 7 illustrates a transmission include multiple pairs of rotatable measurement interfaces and stationary data receivers in accordance with an embodiment.

Referring now to FIG. 7, a representation of a drive system 300 is shown. In some embodiments, the drive system 300 may comprise a portion of, for example, a helicopter. The drive system 300 generally comprises a primary drive shaft 302, a parallel drive shaft 304 that takes power from the primary drive shaft 302, and a plurality of intermediate drive shafts 306 that similarly take power to power loads 308. The loads may comprise rotor hub components, electrical generators, fans, blowers, pumps, or any other rotationally resistive loads. The reference numerals 100 in FIG. 7 represent pairs of rotatable measurement interfaces 102 and corresponding stationary data receivers 102. The locations at which each rotatable measurement interface/stationary data receiver 100 are shown indicate non-limiting possible locations to be utilized with drive system 300 to ensure proper operation of all the various branches of such a drive system 300. Each stationary data receiver of each rotatable measurement interface/stationary data receiver pair is communicatively coupled to an ECU 110 (not shown in FIG. 7). By including multiple rotatable measurement interface/stationary data receiver pairs, the relative torque levels of the various branches (e.g., each of drive shaft 302, parallel drive shaft 304, and intermediate drive shafts 306) of the transmission system can be monitored by the ECU 110. Such data can provide real-time or near real-time information on a multitude of driveline parameters including bearing condition, component alignment, lubrication conditions, improper shaft speeds and/or aging gearboxes. The rotatable measurement interface/stationary data receiver pairs similarly may be applied to any other complex machine, automobile, aircraft, production line system and/or power transmission systems that combine and divide the supplied rotational power at multiple points through a drive system.

The efficiency of the transmission system can be computed based on the signals from the various strain gauges. The transmission efficiency may be computed by the ECU 110 based on strain gauge data received from at least two pairs of rotatable measurement interfaces 102 and stationary data receivers 104.

In some embodiments, the management of operation of system 300 may comprise operating the system to avoid and/or reduce overlap between (1) resonant/natural frequencies and/or harmonics of the resonant/natural frequencies of one or more components of the drive system 300 and (2) the frequencies of potentially damaging stresses, strains, forces, torques, powers, and the like. In alternative embodiments, the rotatable measurement interface/stationary data receiver pairs and associated components may utilize measured strain and estimated transmitted torque with information about a shaft rotational speed to estimate a transmitted power of the shaft so that the transmitted power data may be utilized by operators and/or electronics 106 and/or a computer to evaluate how to operate the drive system 300 more efficiently, thereby potentially saving fuel and/or other energy costs of operating the drive system 300.

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A torque monitoring system, comprising:
   a plurality of rotatable measurement interfaces (102) configured to be attached to a rotatable shaft (90) to rotate with the rotatable shaft (90), the measurement interfaces (102) including a strain gauge (120), a processor (126), a near field communication (NFC) transceiver coil (130), wherein the rotatable shaft (90) is a primary drive shaft (302); and
   a plurality of stationary data receivers (104) contained in a housing (210) and stationary with respect to the rotatable shaft (90), the stationary data receivers (104) including a processor (126) and a NFC transceiver coil (140);
   a transmission;
   a parallel drive shaft (304) mechanically coupled to the primary drive shaft (302) through the transmission, wherein each of the primary and parallel drive shafts (302, 304) includes at least one of the rotatable measurement interfaces (102) wirelessly coupled to a corresponding stationary data receivers (104);
   wherein the rotatable measurement interfaces (102) receives operating power via its NFC transceiver coil (130) that is derived from a radio signal wirelessly transmitted by the NFC transceiver coil (140) in the stationary data receiver (104);
   wherein the processor (126) in the rotatable measurement interfaces (102) is configured to receive strain gauge (120) signals from the strain gauge (120) indicative of torque on the rotatable shaft (90) and wirelessly transmit digital data indicative of the strain gauge (120) signals through the NFC transceiver coils (130, 140) to the processor (126) in the stationary data receiver (104); and
   wherein each stationary data receiver (104) is configured to communicate with an electronics control unit (ECU) (110), and said ECU (110) is configured to determine an efficiency value for the transmission based on digital data received from rotatable measurement interfaces (102) on the primary drive shaft (302) and rotatable measurement interfaces (102) on the parallel drive shaft (304).

2. The torque monitoring system of claim 1 wherein the rotatable measurement interfaces (102) also include a switched reactance element to encode the digital data during transmission to the processor (126) in the stationary data receivers (104).

3. The torque monitoring system of claim 2 wherein the switched reactance element includes at least one of a selectable capacitive divider network and multiple taps of the NFC transceiver coil (130) in the rotatable measurement interfaces (102).

4. The torque monitoring system of claim 1 wherein the (ECU) (110) is coupled to the stationary data receivers (104) and configured to control a speed and torque of the primary drive shaft (302), and wherein, based on the digital data, the stationary data receivers (104) are configured to determine that the primary drive shaft (302) is experiencing a mechanical event and to respond to the determined event by sending a signal to the (ECU) (110) to adjust at least one of speed and torque of the primary drive shaft (302).

5. The torque monitoring system of claim 4 wherein the event includes at least one of: a vibration event, a tension event, compression event, a bending event, a resonance event, and a torque event.

6. The torque monitoring system of claim 1 wherein the processor (126) in the rotatable measurement interfaces (102) determines whether the strain gauge (120) detects a force in excess of a threshold.

7. The torque monitoring system of claim 1 wherein the processor (126) in the stationary data receivers (104) process the digital data to determine whether the strain gauge (120) in the rotatable measurement interfaces (102) detect a force in excess of a threshold.

8. The torque monitoring system of claim 1 wherein the processor (126) in the rotatable measurement interfaces (102) is configured to wirelessly transmit the digital data through the NFC transceiver coils (130) to the processor (126) in the stationary data receivers (104) even if the primary drive shaft (302) is not rotating.

* * * * *